US012138949B2

(12) United States Patent
Berthe et al.

(10) Patent No.: US 12,138,949 B2
(45) Date of Patent: Nov. 12, 2024

(54) METHOD FOR MANUFACTURING A TWO-DIMENSIONAL COLOURED BAR CODE AND ASSOCIATED SECURITY DEVICE

(71) Applicant: IDEMIA FRANCE, Courbevoie (FR)

(72) Inventors: Benoît Berthe, Courbevoie (FR); Paul Azuelos, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 176 days.

(21) Appl. No.: 17/627,721

(22) PCT Filed: Jul. 15, 2020

(86) PCT No.: PCT/FR2020/051268

§ 371 (c)(1),
(2) Date: Jan. 17, 2022

(87) PCT Pub. No.: WO2021/009461

PCT Pub. Date: Jan. 21, 2021

(65) Prior Publication Data

US 2022/0355610 A1 Nov. 10, 2022

(30) Foreign Application Priority Data

Jul. 17, 2019 (FR) ...................................... 19 08087

(51) Int. Cl.
*G06K 19/08* (2006.01)
*B42D 25/305* (2014.01)
(Continued)

(52) U.S. Cl.
CPC ......... *B42D 25/435* (2014.10); *B42D 25/305* (2014.10); *B42D 25/351* (2014.10)

(58) Field of Classification Search
CPC ........... G06K 7/1417; G06K 19/06046; G06K 1/121; G06K 7/1443; B42D 25/305; B42D 25/435; B42D 25/351
(Continued)

(56) References Cited

U.S. PATENT DOCUMENTS 9,035,986 B2 5/2015 Lazzari
11,126,808 B1 * 9/2021 Johnston ............ G06K 7/10722
(Continued)

FOREIGN PATENT DOCUMENTS

FR 2971972 A1 8/2012
KR 101801217 * 11/2017 ........... G06K 7/1443
(Continued)

OTHER PUBLICATIONS

English language abstract of WO 2011/124774.

*Primary Examiner* — Daniel St Cyr
(74) *Attorney, Agent, or Firm* — NIXON & VANDERHYE

(57) ABSTRACT

A method for manufacturing a two-dimensional colored bar code comprising an arrangement of colored basic structural elements encoding at least one information element, the manufacturing method comprising determining, by data processing means, a set of colored basic structural elements corresponding to the at least one information element, at least one structural element of the set comprising a pattern; and forming the at least one structural element of the set on a backing, in order to create the arrangement of colored basic structural elements.

9 Claims, 11 Drawing Sheets

(51) Int. Cl.
*B42D 25/351* (2014.01)
*B42D 25/435* (2014.01)

(58) Field of Classification Search
USPC ............................ 235/462.04, 462.09, 462.1
See application file for complete search history.

(56) References Cited

U.S. PATENT DOCUMENTS

| | | | | |
|---|---|---|---|---|
| 2005/0001419 | A1 | 1/2005 | Levy | |
| 2012/0327450 | A1* | 12/2012 | Sagan | G03G 21/046 358/1.14 |
| 2021/0034933 | A1* | 2/2021 | Abdo | G06K 7/14 |

FOREIGN PATENT DOCUMENTS

| | | | | |
|---|---|---|---|---|
| WO | 2011/124774 | A1 | 10/2011 | |
| WO | 2017133533 | * | 8/2017 | G06K 19/06046 |

* cited by examiner

[Fig. 1]
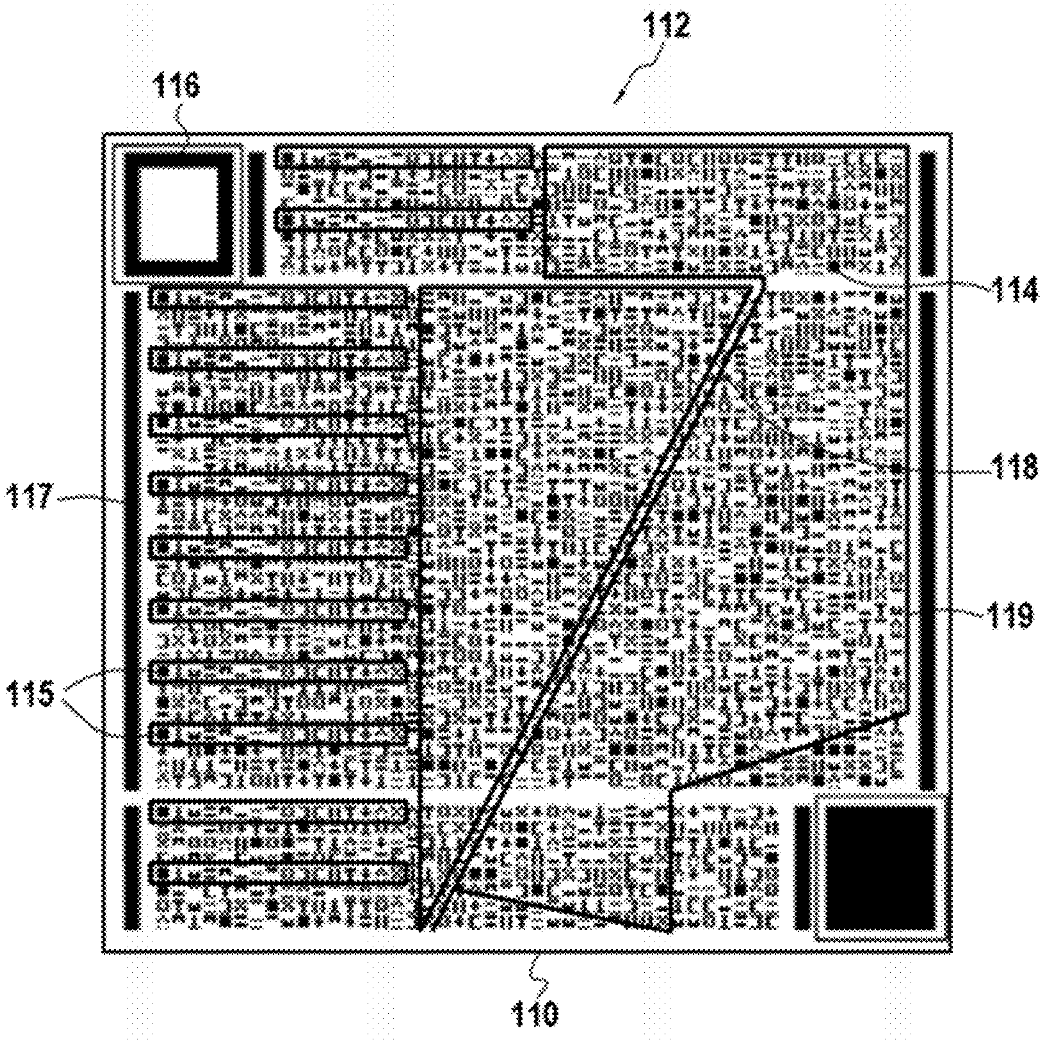

[Fig. 2A]
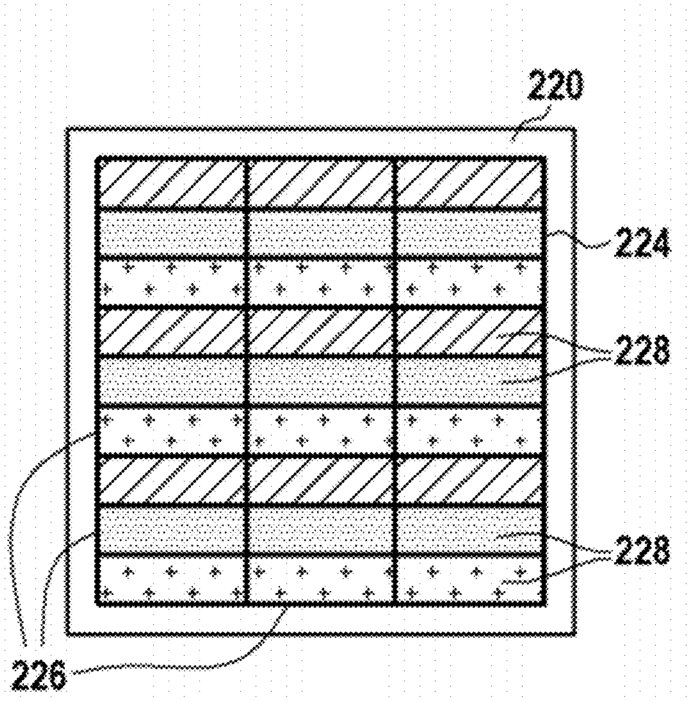
[Fig. 2B]
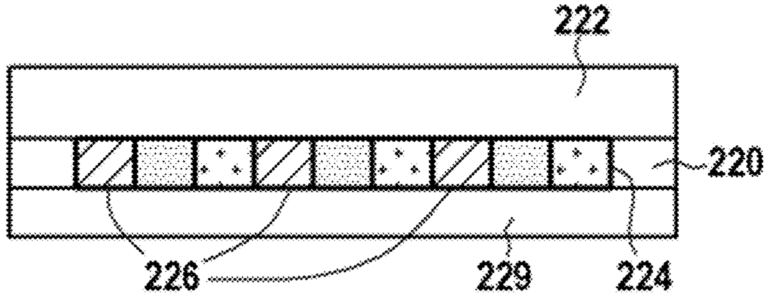

[Fig. 3]
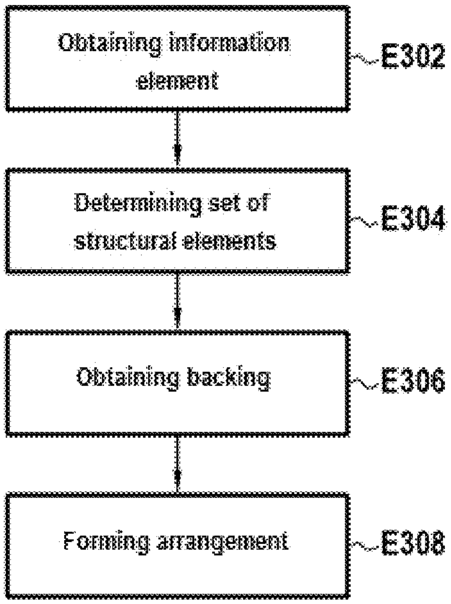
[Fig. 4]
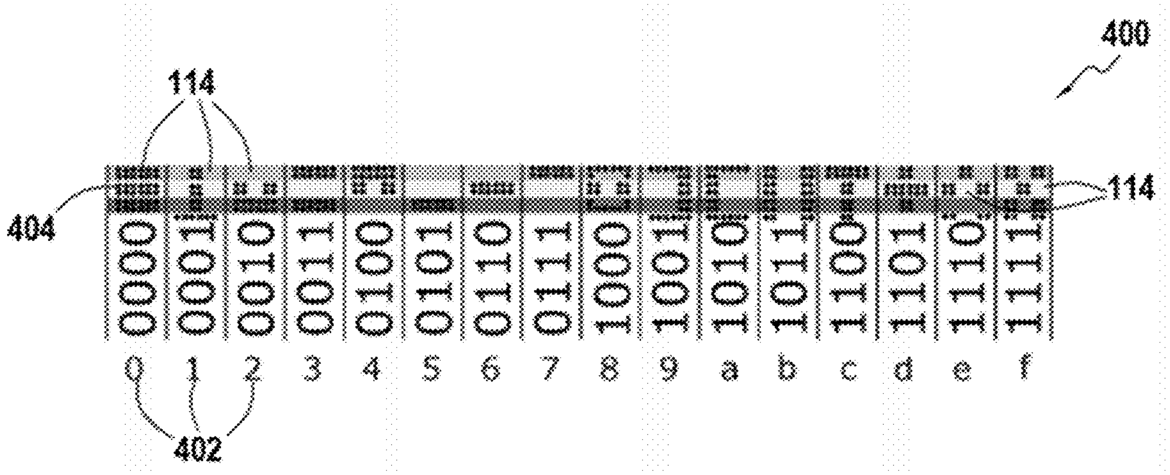

[Fig. 5A]

| R | V | B | 501 | |
|---|---|---|---|---|
| 0 | 0 | 0 | | 0 |
| 0 | 0 | 50 | | 1 |
| 0 | 0 | 100 | | 2 |
| 0 | 50 | 0 | | 3 |
| 0 | 50 | 50 | | 4 |
| 0 | 50 | 100 | | 5 |
| 0 | 100 | 0 | | 6 |
| 0 | 100 | 50 | | 7 |
| 0 | 100 | 100 | | 8 |
| 50 | 0 | 0 | | 9 |
| 50 | 0 | 50 | | 10 |
| 50 | 0 | 100 | | 11 |
| 50 | 50 | 0 | | 12 |
| 50 | 50 | 50 | | 13 |
| 50 | 50 | 100 | | 14 |
| 50 | 100 | 0 | | 15 |
| 50 | 100 | 50 | | 16 |
| 50 | 100 | 100 | | 17 |
| 100 | 0 | 0 | | 18 |
| 100 | 0 | 50 | | 19 |
| 100 | 0 | 100 | | 20 |
| 100 | 50 | 0 | | 21 |
| 100 | 50 | 50 | | 22 |
| 100 | 50 | 100 | | 23 |
| 100 | 100 | 0 | | 24 |
| 100 | 100 | 50 | | 25 |
| 100 | 100 | 100 | | 26 |

[Fig. 5B]
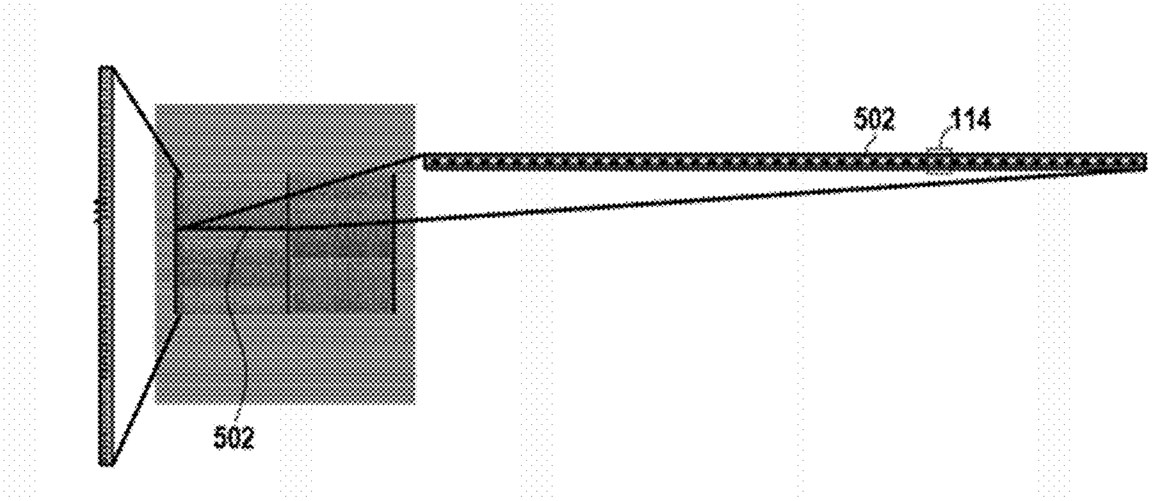
[Fig. 5C]
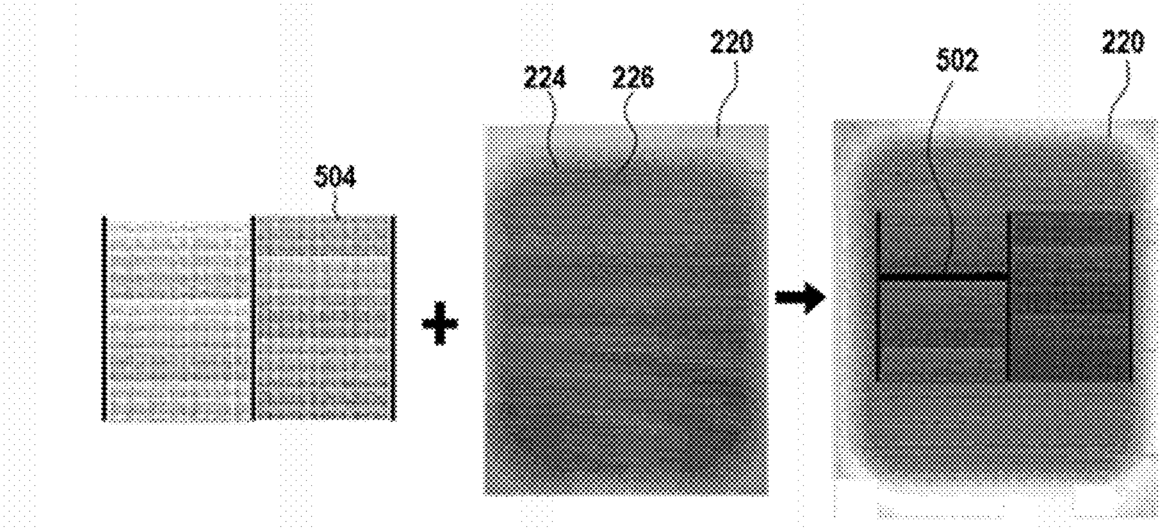

[Fig. 5D]
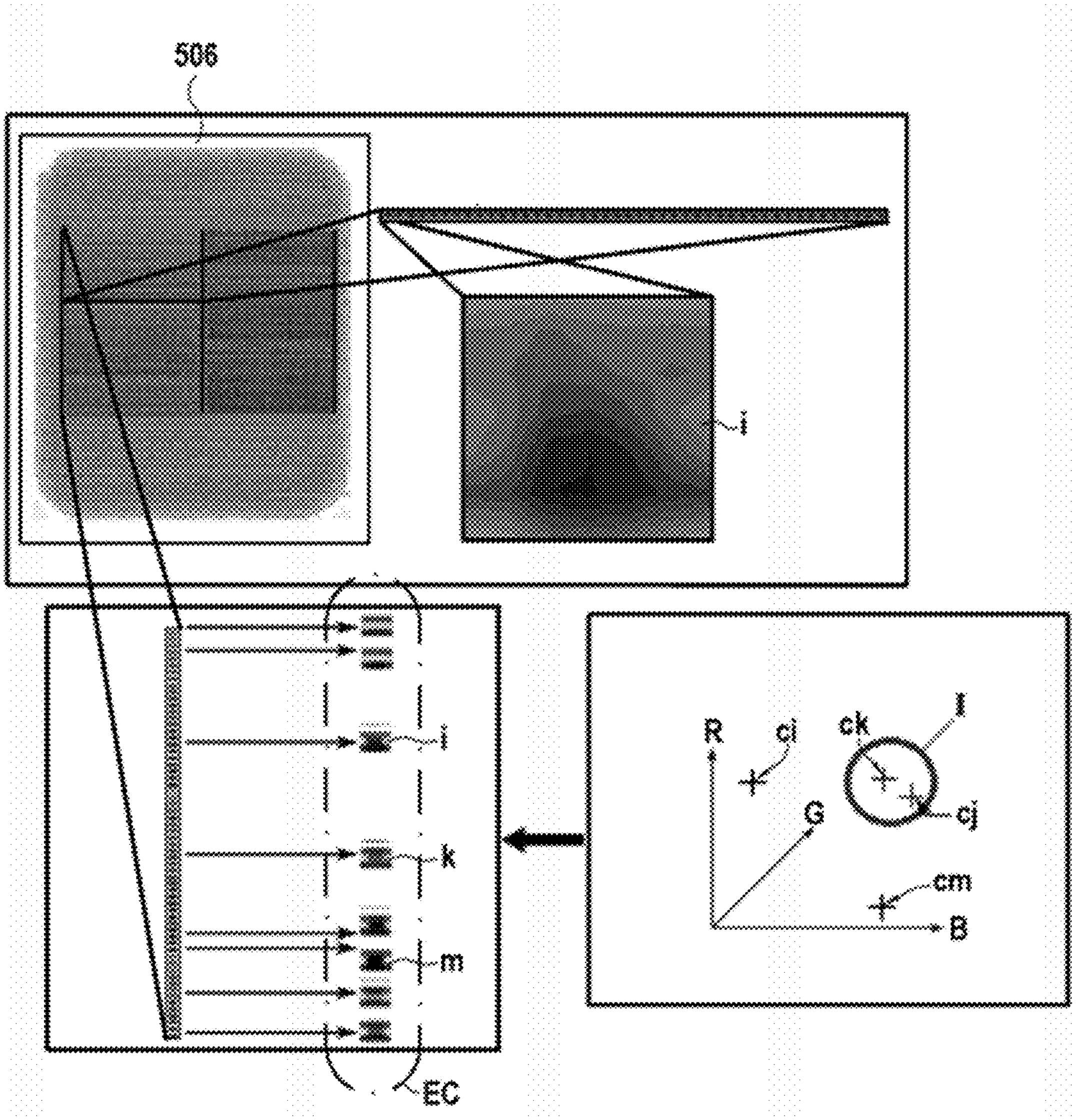

[Fig. 6A]
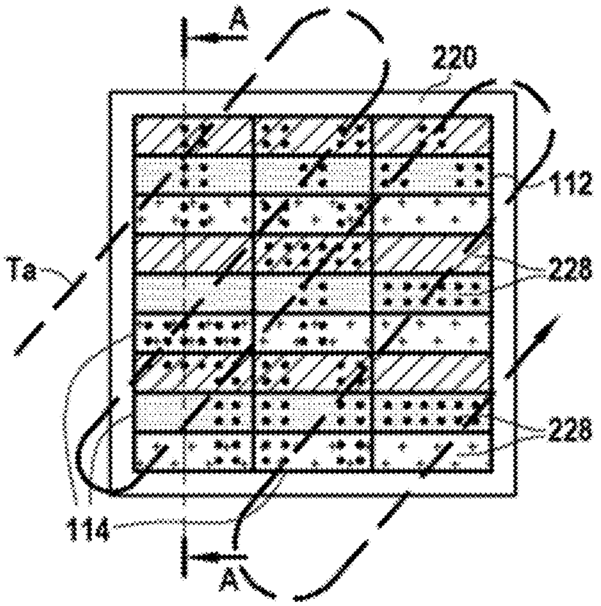
[Fig. 6B]
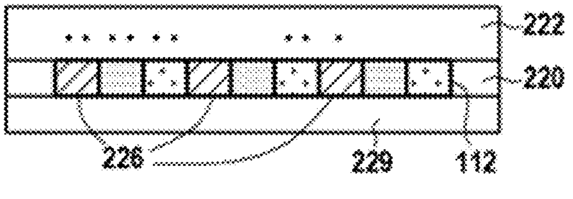

[Fig. 7]
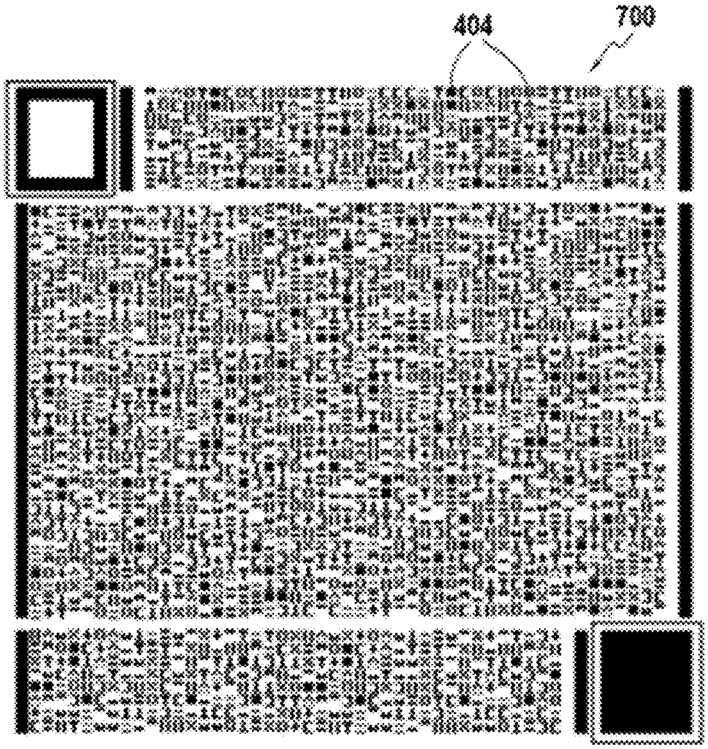
[Fig. 8]
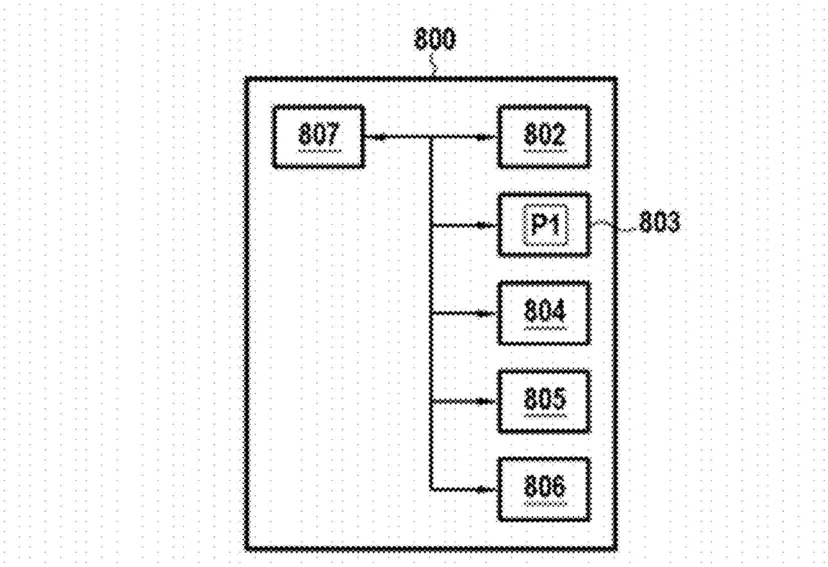

[Fig. 9]
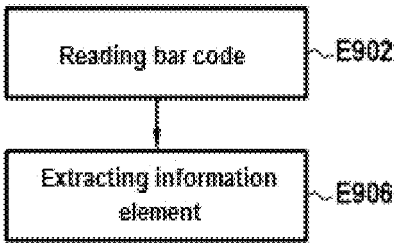
[Fig. 10A]
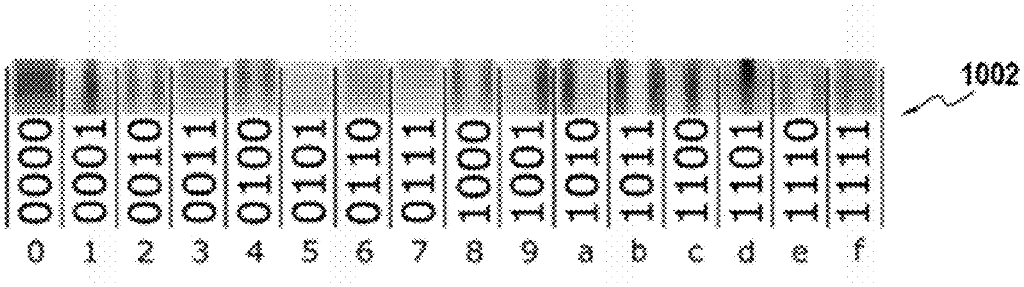
[Fig. 10B]
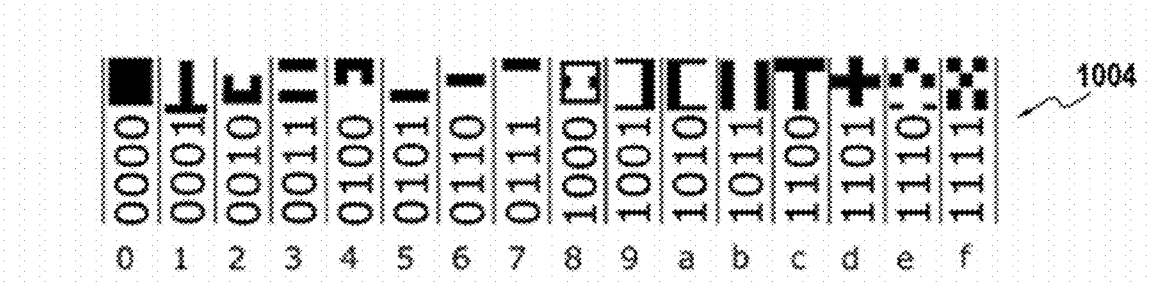

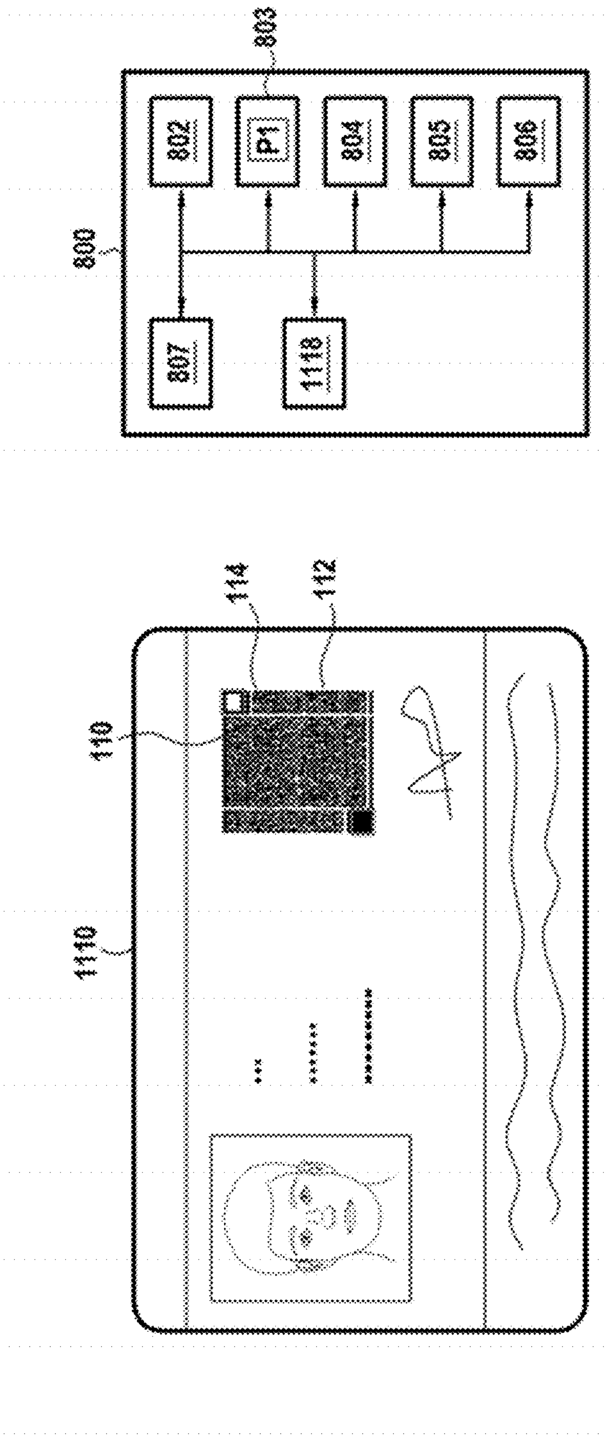
[Fig. 11]

[Fig. 12]
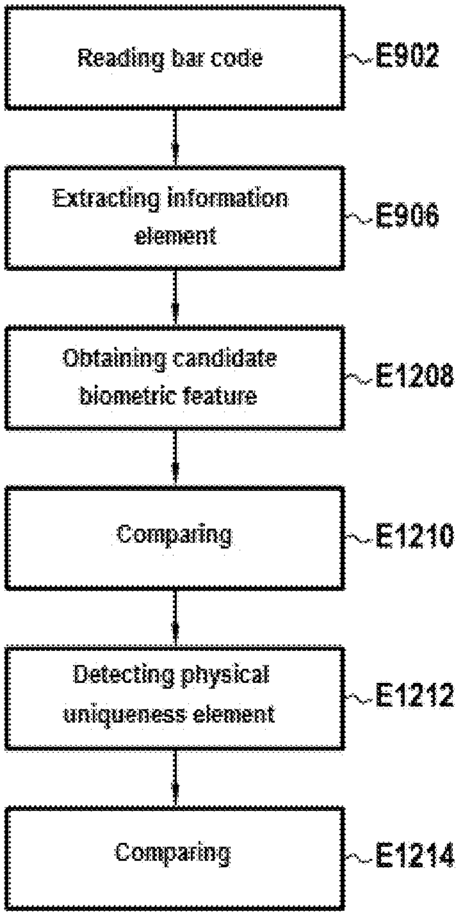

METHOD FOR MANUFACTURING A TWO-DIMENSIONAL COLOURED BAR CODE AND ASSOCIATED SECURITY DEVICE

TECHNICAL FIELD

This disclosure relates to the field of two-dimensional bar codes, and more particularly relates to the manufacturing of a two-dimensional colored bar code.

The invention is non-exclusively applicable to security devices of identity document type, such as passports, identity cards, driving licenses etc.

BACKGROUND

In a known manner, the authentication of a bearer of a security document can be carried out by comparing reference biometric features stored in the security document with candidate biometric features of the bearer, obtained by means of a biometric data sensor.

Due to their important size and security issues, the reference features are stored in a memory of an electronic chip of the security document.

However, the use of an electronic chip in a security document makes the initial manufacturing of the security document and its recycling particularly burdensome and expensive.

SUMMARY

This disclosure relates to a method for manufacturing a two-dimensional colored bar code including an arrangement of colored basic structural elements encoding at least one information element, said manufacturing method including the following steps:

- determining, by data processing means, a set of colored basic structural elements corresponding to the at least one information element, at least one structural element of the set including a pattern, and
- forming the at least one structural element of the set on a backing, in order to create the arrangement of colored basic structural elements, wherein:

- the backing includes a printed matrix including a plurality of pixels, each pixel including at least two sub-pixels of different colors, and
- wherein the forming of the at least one colored basic structural element may include the modification of the backing at the level of at least a part of at least one sub-pixel of at least one pixel of the matrix, said modification making it possible to obtain the color and pattern of the at least one basic structural element.

The disclosure makes it possible to encode and therefore store in the bar code a great quantity of information on a limited surface, for example a part of the surface of a security document.

Specifically, the use of colors in the bar code makes it possible to encode much more data than a two-dimensional bar code in black and white of the same size, i.e. a two-dimensional bar code in which each basic structural element is entirely black, or entirely white. The density of data, i.e. the data quantity (in octets) stored per unit surface (in square millimeters) of such a two-dimensional bar code in black and white is specifically less than 1 octet per square millimeter, while the disclosure allows a greater density of data, typically of at least 4 octets per square millimeter.

In addition, the technique for creating the arrangement allows the secure storage of the information element in the bar code. Specifically, the arrangement cannot be modified without altering the backing of the bar code, unlike conventional printing techniques (inkjet, screen printing or offset for example), making possible the printing of another bar code over the initially formed bar code.

Furthermore, the basic structural element encoding an information element by its color and its pattern, it is possible to read the bar code by means of several different types of sensors, such as a standard color sensor or a grayscale sensor.

In an example, the information element is a reference biometric feature, the method may further include a step of obtaining the at least one information element on the basis of a digital representation of the information element.

Owing to the increase in the data density that the bar code offers, it is possible to store a sufficient quantity of reference biometric features to allow a dependable authentication of the bearer of a security document comprising the bar code, i.e. a sufficient quantity of biometric features to allow the comparison between the reference biometric features and the candidate biometric features verifying the trade-off between acceptable False Rejection Rates (FRR) and False Acceptance Rates (FAR).

The disclosure for example makes it possible to encode an identity photo of 10 kilo-octets at least, which allows the proper operation of the facial comparison algorithms.

In an example, the backing may include a transparent layer, the matrix being printed facing the transparent layer, the modification being an opacification of the transparent layer facing the at least a part of at least one sub-pixel of at least one pixel of the matrix or alternatively an erasure by ablation of at least a part of at least one sub-pixel, or of a combination of opacification and erasure by ablation.

The formation of the structural element thus employs a precise technology, making it possible to form the arrangement of colored basic structural elements without risk of smudging, unlike conventional bar code printing technology.

In addition, the technique of creation of the arrangement allows the secure storage of the information element in the bar code. Specifically, the arrangement being made at the level of two different layers or in different thickness levels of one and the same layer, it cannot be modified without altering the backing of the bar code.

In an example, the opacification is done by means of a laser beam, the laser beam intermittently carbonizing the transparent layer, so as to form a series of points facing said at least a part of at least one sub-pixel.

In an example, the modification is an erasure by ablation of said at least a part of at least one sub-pixel of a pixel of the matrix, carried out by means of a laser beam, so as to at least partly erase the color of said at least a part of at least one sub-pixel.

The forming of the structural element thus employs a specific technology, making it possible to form the arrangement of colored basic structural elements without any risk of smudging unlike conventional bar code printing technology.

In addition, the technique of creation of the arrangement allows the secure storage of the information element in the bar code. Specifically, the arrangement cannot be modified without altering the backing of the bar code.

In an example:

- the at least one information element takes the form of a digital data group may include a plurality of digital data sub-groups, and the determining of a set of colored basic structural elements corresponding to the at least one information element is done by means of a correspondence table associating each different data sub-group with a different structural element of a unique color and/or including a unique pattern.

In an example, the color of each different structural element of the correspondence table is selected in such a way as to be able to be differentiated from the other colors by a digital image sensor the resolution of which is less than the resolution needed for the unit display of a sub-pixel, after the forming step.

An aspect of the disclosure relates to a security device that may include a two-dimensional colored bar code manufactured according to the manufacturing method as described above.

The disclosure further relates to a method for obtaining at least one information element encoded in a two-dimensional colored bar code manufactured according to the manufacturing method as described above, the obtaining method including the following steps:

reading the bar code by means of a digital image sensor, and extracting, by data processing means, the information element on the basis of the arrangement of colored basic structural elements, the extraction being made as a function of the position of each structural element in the arrangement, and as a function of the color and/or of the pattern of each structural element of the arrangement.

In an example, the arrangement of structural elements may include a reference sequence including a plurality of basic structural elements of different colors, and the reading step may include a color calibration of the digital image sensor, based on the reference sequence.

The disclosure also relates to a method for authenticating a bearer of a security device as described above, including a colored bar code comprising an arrangement of colored basic structural elements encoding at least one reference biometric feature, the method including the following steps:

- obtaining the at least one reference biometric feature according to the obtaining method as described above,
- obtaining at least one candidate biometric feature, representing the bearer by means of a biometric sensor,
- comparing, by data processing means, the at least one candidate biometric feature with the at least one reference biometric feature, a correspondence between the at least one candidate biometric feature and the at least one reference biometric feature being a condition of success of the authentication of the bearer.

In an example, the at least one candidate biometric feature corresponds to the at least one reference biometric feature if their distance according to a predefined comparison function is less than a predefined threshold.

In an example, the arrangement of structural elements of the two-dimensional bar code further encodes at least one information element relating to the physical uniqueness of the document, the method further may include the following steps:

- extracting the at least one information element relating to the physical uniqueness of the document,
- detecting at least one physical uniqueness element of the document,
- comparing the at least one information element relating to the physical uniqueness of the document and of the at least one physical uniqueness element of the document, the correspondence between the at least one information element relating to the physical uniqueness of the document and the at least one physical uniqueness element of the document being a condition of success of the authentication of the bearer.

In an example, the different steps of the obtaining method and/or of the authenticating method as described above are determined by computer program instructions.

As a consequence, an aspect of the disclosure also relates to a computer program on an information medium (or recording medium), this program being liable to be implemented by a server or more generally in a computer, this program including instructions suitable for implementing steps of the obtaining method and/or authenticating method as described above.

This program can use any programming language, and be in the form of source code, object code, or intermediate code such as in a particularly compiled form, or in any other desirable form.

In an example, when the computer program includes instructions suitable for implementing the steps of the obtaining method, the instructions of the computer program in particular make it possible to control the digital image sensor so that it reads the bar code, and thus allow the obtaining of a digital bar code image or at least a part of the bar code.

An aspect of the disclosure also relates to an information medium (or a recording medium) readable by a server or more generally by a computer, and including instructions of a computer program as mentioned above.

The information medium can be any entity of the device capable of storing the program. For example, the medium can include a storage means, such as a rewritable non-volatile memory (of EEPROM or Flash NAND type for example), or such as a ROM, for example a CD-ROM or a microelectronic circuit ROM or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit in which the program is incorporated, the circuit being suitable for executing or for being used in the execution of the method in question.

BRIEF DESCRIPTION OF THE DRAWINGS

Other features and advantages of this disclosure will become apparent from the description below, with reference to the appended drawings which illustrate an example thereof without any limitation. In the figures:

FIG. 1 schematically represents an example of a bar code able to be made according to the method of FIG. 3;

FIG. 2A schematically represents a top view of an example of a backing that can be used during the implementation of the method of FIG. 3;

FIG. 2B schematically represents a section of the backing of FIG. 2A;

FIG. 3 represents, in the form of a flow chart, the main steps of a manufacturing method in accordance with an example of an aspect of the disclosure;

FIG. 4 schematically represents an example of a correspondence table that can be used during the implementation of the method of FIG. 3, FIG. 5A schematically represents a step of selecting the colors of the correspondence table of FIG. 4;

FIG. 5B schematically represents a step of selecting colors from the correspondence table of a FIG. 4;

FIG. 5C schematically represents a step of selecting colors from the correspondence table of FIG. 4;

FIG. 5D schematically represents a step of selecting colors from the correspondence table of FIG. 4;

FIG. 6A schematically represents an example of arrangement of structural elements created on the backing of FIG. 2A;

FIG. 6B schematically represents a section along A-A of the arrangement of structural elements of FIG. 6A;

FIG. 7 schematically represents an example of a modification sequence that can be used during the implementation of the method of FIG. 3;

FIG. 8 schematically represents an example of a bar code reader able to implement the obtaining method of FIG. 9;

FIG. 9 represents, in the form of a flow chart, the main steps of an obtaining method in accordance with an exemplary aspect of the disclosure;

FIG. 10A schematically represents an example of a comparison table that can be used during the implementation of the method of FIG. 9;

FIG. 10B schematically represents another example of a comparison table that can be used during the implementation of the method of FIG. 9;

FIG. 11 schematically represents an example of a security device in accordance with an exemplary aspect of the disclosure;

FIG. 12 represents, in the form of a flow chart, the main steps of an authenticating method in accordance with an exemplary aspect of the disclosure.

DETAILED DESCRIPTION

This disclosure relates to the manufacturing of a two-dimensional colored bar code 110, also known as a high-density colored bar code 110, which can typically take the shape of a "datamatrix" type code.

As shown in FIG. 1 which schematically represents an example of a colored bar code 110, the colored bar code 110 may include an arrangement 112 of colored basic structural elements 114, this arrangement 112 encoding at least one information element, typically in an encoding part 118 of the arrangement, the part being able to be discontinuous.

Each information element can be a digital data item relating to the security device on which the bar code 110 is formed, a digital data relating to the authorized bearer of the security device (such as a reference biometric feature), or a digital data item relating to the organization that manufactured (or issued) the security device.

Each basic structural element 114 corresponds to an elementary entity of the arrangement 112. All the basic structural elements typically have the same geometric shape, for example a triangular, rectangular, hexagonal or square shape.

The arrangement 112 of structural elements 114 may include one or more reference sequences 115, each reference sequence 115 being positioned at a different location of the arrangement 112.

Each reference sequence 115 typically includes a basic structural element 114 of each different color that can be present on the bar code 110. Each reference sequence 115 can thus be used by a reader for calibration purposes, as explained below with reference to FIG. 9.

Furthermore, the bar code 110 may include marks 116 for detection of the bar code and marks 117 for detection of information areas, these marks 116, 117 also being able to be used during the reading of the bar code 110.

In addition, the bar code 110 may include an error correction part 119, this part being able to be discontinuous.

The bar code 110 is formed on a backing 220 such as for example the backing 220 shown in FIGS. 2A and 2B. The backing 220 is typically a substrate comprising a transparent layer 222 and a matrix 224 printed facing the transparent layer 222, i.e. on one of the faces of the transparent layer 222 or on another layer 220 positioned facing the transparent layer 222. The matrix 224 may include a plurality of pixels 226, each pixel 226 comprising at least two sub-pixels 228 of different colors. Each pixel 226 typically comprises three sub-pixels 228 of different colors, for example the primary colors red, green and blue or yellow, magenta and cyan. As a variant, each pixel may include four sub-pixels 228 of different colors, for example yellow, magenta, cyan and white.

In the example of FIGS. 2A and 2B, each pixel 226 is of square shape and each sub-pixel 228 is of rectangular shape. In an example, the pixels 226 of the matrix 224 can take the form of another geometrical figure, such as a rectangle or a triangle (the sub-pixels 228 being then also able to take the shape of a triangle).

In the example of FIGS. 2A and 2B, the matrix 224 comprises nine pixels. However, the matrix 224 can of course include more than nine pixels.

For example, for a matrix 224 of 85.6 mm*26.99 mm which can typically be used for a security document, the size of a pixel can be $(4*70\ \mu m)^2$. The maximum number of pixels is then close to 3.10^4 pixels.

The matrix 224 can be printed on the transparent layer 222 or on an opaque layer 229 of the backing 220. The opaque layer 229 is typically of white color.

Furthermore, in the example of FIGS. 2A and 2B, the matrix 224 is positioned between the transparent layer 222 and the opaque layer 229 of the backing 220. In an example, the transparent layer can be positioned between the matrix 224 and the opaque layer 229.

In an example, the backing 220 does not include any transparent layer 222.

In an example, the backing 220 may include a blank layer on which is positioned a first transparent layer, the matrix being positioned on the first transparent layer and a second transparent layer being positioned on the matrix.

The backing 220 can be incorporated into a security device, for example a pass or a security document. The security document can be an identity document such as a passport, an identity card, a driving license, etc.

The backing 220 can thus be a card body or a page of a security document, for example a page of data of a passport.

FIG. 3 represents a method for manufacturing a colored bar code 110 such as the bar code 110 of FIG. 1, the method being compliant with an aspect of the disclosure. The manufacturing method is typically implemented by a manufacturing system comprising digital data processing means and a laser beam, typically having a wavelength of 1064 nm.

The data processing means typically take the form of a computer, executing a computer program stored in an information medium (or memory) readable by the computer.

In a step E302, one or more information elements are obtained by the data processing means of the manufacturing system.

In order to simplify the rest of the description, it will henceforth be considered that a single information element is obtained in step E302. It will however be understood that, for the implementation of the invention, several information elements may be obtained in this step E302, then encoded in the colored bar code 110 during the implementation of the following steps.

The information element typically takes the form of a digital data group comprising a plurality of digital data sub-groups.

The information element is typically obtained on the basis of a digital representation of this information element, for example on the basis of a digital image. Image processing, which depends on the nature of the information element, may be done on the digital image in order to extract the information element.

The information element is for example a reference biometric feature, typically obtained from a digital image, the reference biometric feature being able to be used for the authentication of a security document bearer.

The digital image is typically an image or the signature of the face, an iris or a fingerprint of the bearer of the security document. The reference biometric feature can thus be a set of particular points of the face, the iris or the fingerprint (these particular points can be referred to as minutiae in the case of a fingerprint). This set of particular points is chosen so as to reliably represent the authorized bearer of the security document.

In an example, the information element is a digital data relating to the security device on which the bar code 110 is formed, a digital data item relating to the user (or bearer) of the security device, or a digital data relating to the organization that manufactured (or issued) the security device.

In a step E304, a set of colored basic structural elements corresponding to the information element obtained in step E302 is determined, by the data processing means of the manufacturing system. This step thus makes it possible to convert the information element into a set of colored basic structural elements to form on a backing in order to create the bar code 110.

The determination of the set of structural elements is typically done by means of a first correspondence table, associating each different data sub-group with a different structural element, of a unique color and being able to comprise a unique pattern.

Thus, each data sub-group of the information element can be searched for in the first correspondence table, in order to obtain the associated structural element 114 and thus determining the set of structural elements.

Each searched-for data sub-group can be obtained after carrying out a change of numerical base (or radix) at the level of the data group.

FIG. 4 schematically represents an example of a first correspondence table 400 that can be used in step E304.

This first correspondence table associates sixteen different structural elements 114 with sixteen different sub-groups of data 402, each different data sub-group 402 corresponding to a different hexadecimal base symbol. Thus, when the information element is not encoded in hexadecimal, it is necessary to make a change of numerical base in order to obtain an information element encoded in hexadecimal. The information element may then include a group of hexadecimal base symbols, each symbol being a data sub-group 402 that can be searched for in the first correspondence table 400.

The color of each structural element 114 of the first table 400 is unique, i.e. different from the colors of the other structural elements 114 of the first table 400. Furthermore, each structural element 114 of the first table 400 may include a unique pattern 404, i.e. a different pattern 404 from the patterns 404 of the other structural elements 114 of the first table 400.

Each color of structural element 114 of the correspondence table that can be used in step E304 is selected in such a way as to be able to be differentiated from the other colors by a video camera described below (for example a low-resolution color video camera), the resolution of which is less than the resolution needed for the unit display of a sub-pixel, during a reading of the colored bar codes 110, after a step E308 of forming the structural element 114. This makes it possible to minimize the risk of error during the reading of the bar code 110.

The selection of the colors of the structural elements 114 of the first correspondence table is made during a preliminary phase, preceding the use of the first correspondence table, and therefore before step E304. Each color can be defined by varying the gray levels of a plurality of different primary colors (for example the colors red, green and blue) forming the pixel matrix. Each primary color has a different position in the visible spectrum.

As shown in FIG. 5A, with three gray scales (0;50;100) for each primary color R, V, B, it is possible to generate twenty-seven different colors 501. However, certain colors can be too close and thus could be sources of error during the reading of the bar codes. The selection, for example, of sixteen colors from among the twenty-seven different colors however makes it possible to obtain a bar code four times more compact than a two-dimensional bar code in black and white. The greater the number of colors selected, the greater the data density.

The colors can be selected from among a set of colors (for example the set of colors 501 of FIG. 5A) by means of a reference scanner, such that only the colors of the set that can be easily differentiated after having been scanned by the reference scanner are selected.

More precisely, during the preliminary phase of selection of the colors, for each color of the set, different color areas can be defined by the data processing means.

As shown in FIG. 5B, the colored areas 502 are for example rows, each row 502 being formed by several basic structural elements 114 of the same color.

The colored areas 502 are then formed on a flat surface, such as a sheet. The colored areas 502 can be printed, for example by means of an inkjet or laser printer. In an example, as shown in FIG. 5C, the colored areas 502 can be formed by modification of a flat backing having for example the same structure as the backing of FIGS. 2A and 2B, using a modifying sequence 504 based on the defined color areas 502. The modification of the backing can be done using the method described below with reference to step E308.

The flat surface is then scanned by the reference scanner, the reference scanner thus obtaining a digital image 506 of the flat surface. The color of each pixel of the digital image 506 can then be measured, typically in levels of primary colors. FIG. 5D represents the color of four different pixels i, j, k and m of the digital image 506 in a colorimetric space. The color cj of the pixel j being too near to the color ck of the pixel k (in the figure positioned in a predefined interval I of nearby colors in the primary color space RGB), the color cj of the pixel j is not selected and is therefore not part of the set EC of final colors that can be used. The selection of colors can be done in a complementary way using other differentiation parameters such as the geometry of the colored basic structural element 114 or the position of the colored basic structural element 114 in the bar code.

The number of possible combinations of encoding by means of the first correspondence table and the matrix 224 is of $M^N$ combinations, with M the number of different structural elements of the table, and N the number of locations available on the matrix 224, i.e. the number of pixels of the matrix 224 being able to be used for the encoding of the information element, for example the number of pixels that can be used to form the structural elements of the encoding part 118 of the arrangement.

It is for example considered that all the pixels of the matrix 224 of FIGS. 2A and 2B are used to form the information element. If the first correspondence table of FIG. 4 is used, there are then $16^4$ possible combinations of encoding on this matrix 224.

Additional structural elements, used to minimize the risk of reading errors, can be added to the set of colored basic structural elements determined in step E304. These additional structural elements are for example obtained using the Reed-Solomon error correction algorithm. Furthermore, the structural elements of the reference sequences can be added to the set.

The manufacturing method can further include a step E306 of obtaining the backing 220 on which the bar code 110 can be formed, such as for example the backing 220 shown in FIGS. 2A and 2B. The backing 220 is for example manufactured, the manufacturing of the backing 220 may include the printing of the matrix 224 on the transparent layer 222 or on the opaque layer 229, and optionally the lamination of the backing layers 220.

Next, in a step E308, at least one structural element 114 of the set of colored basic structural elements is formed on the backing 220, in order to create the arrangement 112 of colored basic structural elements 114.

In this step E308, the arrangement 112 of structural elements 114 can be created by forming the structural elements 114 of the set determined in step E304, for example along a predefined trajectory.

The forming of a structural element 114 of the set may include a sub-step of modifying the backing 220 at the level of at least a part of at least one sub-pixel 228 of at least one pixel 226 of the matrix 224, this modification making it possible to obtain the color of the structural element 114, and optionally the pattern 404 of the structural element 114. The modification is typically made by means of the laser of the manufacturing system.

Thus, a pixel 226 of the matrix 224 becomes, after modifying the backing 220 at the level of at least a part of at least one of its sub-pixels 228, a structural element 114 of the arrangement 112.

The modification is for example an opacification of the transparent layer 222, with facing said at least a part of at least one sub-pixel 228, done by means of the laser beam. For example, for each structural element 114 of the set, the laser beam intermittently carbonizes the transparent layer 222 so as to form a series of points facing said at least a part in the transparent layer 222 (i.e. between the two outer faces of the transparent layer 222), for example two or four points.

The carbonization of the transparent layer 222 with regard to at least a part of a sub-pixel 228 of a pixel 224 generates a gray level at the level of this sub-pixel 228, which makes it possible to obtain the color of the structural element 114 on the basis of the pixel 226.

In addition, the carbonization of the transparent layer 222 facing at least a part of a sub-pixel 228 of a pixel 226 makes it possible to obtain the pattern 404 of the structural element 114 created from the pixel 226. For example, the series of points is formed such as to reproduce the pattern 404 of the structural element 114 as shown by the first table 400.

The modification of the backing 220 is typically an opacification when the color of the sub-pixels is done using a printing technology.

FIGS. 6A and 6B represent the backing 220 of FIGS. 2A and 2B on which an arrangement 112 of colored basic structural elements 114 was created during the implementation of step E308.

The arrangement 112 of FIGS. 6A and 6B may include nine structural elements 114, arranged along a trajectory Ta.

The nine structural elements 114 were obtained in step E304 by means of the first table 400 of FIG. 4, so that they encode an information element taking the value 1f59ce6b6.

As can be seen in FIGS. 6A and 6B, each sub-pixel 228 may for example be a rectangle that can be divided into three equal parts (typically three squares), the laser being able to carbonize the transparent layer 222 so as to form one or more points facing each part (for example two or four points). Of course, other configurations can be envisioned.

The modification can, for example, be an erasure by ablation of said at least a part of at least one sub-pixel 228, done by means of the laser beam. For example, for each structural element 114 of the set, the laser beam at least partly erases the color of at least a part of at least one sub-pixel.

The modification is typically an erasure by ablation when the color of the sub-pixels is formed by a light diffraction device, for example using a hologram.

All the structural elements 114 of the set are for example formed on the backing 220 in step E308.

In an example, the forming of one or more structural elements 114 of the set does not require any modification of the backing 220. Each of these structural elements does not then include any pattern 404, and the color of the element is defined by the sub-pixels of the associated pixel.

In order to guide the laser during the modification of the backing 220, for example during the carbonization or erasure by ablation of the matrix, a sequence of modifications can be used, this sequence comprising all the modifications that must be made on the backing 220. This sequence may include all the patterns of all the structural elements 114 that must be formed, these patterns being arranged along the predefined trajectory of the arrangement. FIG. 7 shows an example of a modification sequence 700, used to manufacture the bar code of FIG. 1.

The colored bar code 110 created according to the method of FIG. 3 can then be read in order to obtain the encoded information element.

FIG. 8 schematically represents a colored bar code reader 800 in accordance with an aspect of the disclosure, able to implement an obtaining method in accordance with an exemplary embodiment, for example the method described with reference to FIG. 9.

The reader 800 has the conventional architecture of a computer, and can in particular comprise a processor 802, a read-only memory 803 (of ROM type), a rewritable non-volatile memory 804 (of EEPROM or Flash NAND type for example), a rewritable volatile memory 805 (of RAM type), a communication interface 806 and/or a digital image sensor 807.

In this example, the read-only memory 804 constitutes an information (or recording) medium in accordance with an aspect of the disclosure. A computer program P1 is stored in the read-only memory 804, thus allowing the reader 800 to implement at least a part of an obtaining method in accordance with an aspect of the disclosure. In an example, the computer program P1 is stored in the rewritable non-volatile memory 805. The reader 800 thus may include data processing means.

The sensor 807 is typically a low-resolution color video camera, a grayscale video camera, for example high-resolution, or else a scanner.

The reader 800 can be able to communicate, via the communication interface 806 and a telecommunications network, with an external electronic device such as a server.

The reader 800 is able to read, by means of the sensor 807, a colored bar code 110 in accordance with an aspect of the disclosure.

FIG. 9 represents a method for obtaining at least one information element encoded in a colored bar code 110 manufactured according to the method of FIG. 3, for example the bar code 110 of FIG. 1 or of FIG. 6A.

In a step E902, the bar code 110 is read by means of the digital image sensor 807.

When the bar code 110 includes at least one reference sequence 115, the reading step E902 may include a color calibration of the sensor 707. Specifically, the reference sequence 115 typically includes a basic structural element 114 of each different color that can be present on the colored bar code 110, this sequence can be used as a model in order to dynamically calibrate the sensor 807 and to differentiate the colors during the reading of the colored bar code 110.

This calibration makes it possible to offset the variation in transcription of the color that may occur between two sensors of different types or two sensors of one and the same type but differently calibrated, or the variation in transcription of the color by one and the same sensor but under different lighting conditions (for example non-white lighting conditions, which distort color.)

This calibration moreover makes it possible to offset color variations between two different bar codes, due to the manufacturing of the bar codes. These color variations are typically due to a variation in the colors of sub-pixels of the matrix, a deformation of the matrix, a variation in the power of the laser or in the position of the modifications made by the laser.

In a step E906, the reader 800, or more precisely the data processing means of the reader 800 extract the information element from the arrangement 112 of colored basic structural elements 114.

The extraction is done as a function of the position of each structural element 114 in the arrangement 112, or more precisely as a function of the trajectory of the arrangement, and also as a function of the color and/or the pattern 404 of each structural element 114 of the arrangement 112 encoding the information element, for example each structural element 114 of the encoding part 118.

The color and the pattern 404 of each structural element 114 of the encoding part 118 can thus be used in combination, when the definition of the sensor 807 allows it. If the definition of the sensor 807 is low, only the color can be used.

Specifically, the reading of the colored bar code does not require a very high-performance camera. But, in the event of a malfunction of a color camera, it is always possible to obtain a reading of the patterns 404 by a higher-performance grayscale camera N. The patterns 404, isolated, can thus form a "back-up" code in the event of a reading malfunction of the colored bar code.

More precisely, a second correspondence table can be used in order to search for each structural element 114 of the arrangement 112 and to determine the corresponding data sub-group. The data sub-groups are positioned one with respect to the others according to the position of each structural element 114 in the arrangement 112, and therefore along the trajectory of the arrangement.

Furthermore, the structural elements 114 of the error correction part 119 can also be searched for in the second correspondence table then be used to determine the data sub-groups.

Each structural element 114 of the arrangement 112 can be searched for in the second correspondence table using the color of the structural element 114 and/or the pattern of the structural element 114, the color and the pattern of the structural element 114 encoding the same information.

The second correspondence table can be the first correspondence table used in step E304 of the manufacturing method, or a correspondence table 1002 associating each data sub-group with the color of each different structural element (see FIG. 10A), or else a correspondence table 1004 each associating a data sub-group with the pattern 404 of each different structural element (see FIG. 10B).

Specifically, when the sensor 807 is a sensor able to differentiate between colors such as a low-resolution color camera, the color of the structural element obtained during the reading of step E902 is searched for in the second correspondence table.

When the sensor 807 is a sensor able to differentiate between gray levels such as a grayscale camera, the pattern of the structural element obtained during the reading in step E902 is searched for in the second correspondence table.

The manufacturing of the bar code 110 according to the method of FIG. 3 thus allows the bar code 110 to be readable by several different types of sensors 807.

The result of step E906, i.e. the information element extracted by means of the error correcting code and of the arrangement 112, can be used in order to define the next reference sequences to be formed, and thus to refine the detection model, typically when the extraction is made as part of machine learning.

As indicated above, the backing 220 on which the colored bar code 110 is created according to the method of FIG. 3 can be integrated with a security device such as a security document 1110 (see FIG. 11). The information element encoded by the colored bar code can be a reference biometric feature characterizing the bearer of the security document, this reference biometric sensor being able to be used to authenticate the authorized bearer of the security document.

The reader 800 of FIG. 8 can thus be a security document reader able to implement an authenticating method in accordance with an aspect of the disclosure, for example the method described with reference to FIG. 12. The reader 800 then further may include a biometric sensor 1118, and the computer program P1 can allow the reader 800 to implement all or part of the authenticating method.

The biometric sensor 1118 is for example an optical sensor typically able to obtain digital images of fingerprints, or a digital camera or a digital video camera able to obtain digital images of faces and/or irises.

FIG. 12 represents a method for authenticating a bearer of a security document comprising a colored bar code 110 manufactured according to the method of FIG. 3, for example the colored bar code 110 of FIG. 1 or of FIG. 6A.

The colored bar code 110 encodes a reference biometric feature, characterizing the bearer of the security document.

Steps E902 and E906 of the obtaining method described in FIG. 9 are implemented by the data processing means of the reader 800 in order to extract the reference biometric feature of the bar code 110.

In a step E1208, at least one candidate biometric feature, representative of the bearer, is obtained by means of the biometric sensor 118.

In order to simplify the rest of the description, in the remainder of the text it will be considered that a single candidate biometric feature is obtained in step E1208. It will however be understood that, for the implementation of the disclosure, several candidate biometric features can be obtained in step E1208, which are then compared to several reference biometric features in a step E1210 described below.

In a step E1210, the data processing means of the reader 800 compare the candidate biometric feature with the reference biometric feature, a correspondence between the candidate biometric feature and the reference biometric feature being a condition of success of the authentication of the bearer.

The candidate biometric feature typically corresponds to the reference biometric feature if their distance according to a predefined comparison function is less than a predefined threshold.

If the candidate biometric feature corresponds to the reference biometric feature, the authentication of the bearer is typically successful. If the candidate biometric feature does not correspond to the reference biometric feature, the authentication of the bearer fails.

The arrangement of structural elements 114 of the colored bar code can furthermore encode at least one information element relating to the physical uniqueness of the security document.

This information element, which can be called a signature of the security document 1110, is for example coordinates of a set of points with respect to a predetermined reference mark, these coordinates representing a Physical Unclonable Function (PUF).

A Physical Unclonable Function is the result of an easily implementable phenomenon, this result being impossible to replicate even under the same operating conditions.

For example, the coordinates represent a deformation of the security document 1110 due to heat. The method of manufacturing of the security document 1110 may include the heat-input assembly of a first layer with at least a second layer, this heat input being, where applicable, accompanied by the application of pressure on the layers. The first layer (for example the transparent layer 222) can typically be made of a thermoplastic polymer material and comprises a reference pattern, for example the matrix itself, comprising a determined set of points. The reference pattern is typically printed on a sensitive area of the security document, i.e. an area able to be altered, such as an area comprising information identifying the authorized bearer of the security document 1110, for example the photo of the authorized bearer, a hinge of the security document etc.

The assembly of the layers leads to a deformation of the first layer and therefore a deformation of the pattern of the first layer, this deformation not being able to be predicted in advance. The differences in amplitude and orientation between the points of the initially printed pattern and those of the pattern obtained after assembly thus form a signature that is impossible to replicate. The differences in amplitude and orientation can then be detected optically, then stored in the form of coordinates in the arrangement 112 of structural elements 114.

Thus, steps E902 and E906 of the obtaining method described with reference to FIG. 9 can also be implemented by the data processing means of the reader 800 in order to extract from the bar code 110 the information element relating to the physical uniqueness of the security document.

In a step E1212, at least one physical uniqueness element of the document can be detected by an appropriate sensor of the reader 800, or a higher-resolution reader 800 used by forensics departments during criminal enquiries. The detected element is typically the coordinates of the points of the determined set of points of the pattern.

Then, in a step E1214, the information element relating to the physical uniqueness of the document is compared to the physical uniqueness element of the document, a correspondence between the information element relating to the physical uniqueness of the document and the physical uniqueness of the document being a condition of success of the authentication of the bearer.

If the pattern has been altered following the manufacturing of the security document 1110, the information element relating to the physical uniqueness of the document does not correspond to the physical uniqueness of the security document 1110 and the authentication of the bearer fails.

If the pattern has not been altered following the manufacturing of the security document, the information element relating to the physical uniqueness of the security document 1110 corresponds to the physical uniqueness of the security document 1110. The authentication of the bearer is then successful. In an example, the authentication of the bearer is successful in the event of correspondence between the information element relating to the physical uniqueness and the physical uniqueness element of the security document 1110, and in the event of correspondence between the candidate biometric feature and the reference biometric feature in step E1210.

The invention claimed is:

1. A method for manufacturing a two-dimensional colored bar code comprising :

encoding an information element with a set of colored basic structural elements, at least one structural element of the set comprising a visual pattern; and forming the basic structural elements of the set on a backing in compliance with a predetermined layout, in order to create an arrangement of basic structural elements, wherein the backing comprises a printed matrix comprising a plurality of pixels, wherein each pixel of the plurality of pixels comprises at least two sub-pixels of different colors;

wherein forming the basic structural elements comprises coloring the basic structural elements in compliance with the encoding and generating the visual pattern by modifying the backing at the level of at least a part of at least one sub-pixel of at least one pixel of the matrix.

2. The manufacturing method of claim 1, wherein the information element is a reference biometric feature, wherein the manufacturing method further comprises obtaining the information element on the basis of a digital representation of the information element.

3. The manufacturing method of claim 1, wherein the backing comprises a transparent layer, wherein the matrix is printed facing the transparent layer, and wherein modifying the backing comprises making opaque the transparent layer facing the at least a part of at least one sub-pixel of at least one pixel of the matrix.

4. The manufacturing method of claim 3, wherein making opaque the transparent layer is performed by a laser beam, wherein the laser beam intermittently carbonizes the transparent layer so as to form a series of points facing at least a part of at least one sub-pixel.

5. The manufacturing method of claim 1, wherein modifying the backing comprises erasing by ablation of the at least a part of at least one sub-pixel of a pixel of the matrix, wherein erasing is carried out via a laser beam so as to at least partly erase the color of the at least a part of at least one sub-pixel.

6. The manufacturing method according to claim 1, wherein the information element takes the form of a digital data group comprising a plurality of digital data sub-groups, and wherein encoding the information element with the set of colored basic structural elements comprises determining the set via a correspondence table associating each one of a different data sub-group with a different structural element of at least one selected from a group of a unique color and a unique pattern.

7. The manufacturing method of claim 6, wherein the color of each different structual element of the correspondence table is selected to be differentiated from other colors by a digital image sensor having a resolution which is less than a resolution needed for the unit display of a sub-pixel, after forming the at least one structural element of the set on a backing.

8. A security device comprising a two-dimensional colored bar code manufactured according to a manufacturing method comprising:

encoding an information element with a set of colored basic structural elements, at least one structural element of the set comprising a visual pattern; and forming the basic structural elements of the set on a backing in compliance with a predetermined layout, in order to create an arrangement of basic structural elements, wherein the backing comprises a printed matrix comprising a plurality of pixels, wherein each pixel of the plurality of pixels comprises at least two sub-pixels of different colors;

wherein forming the basic structural elements comprises coloring the basic structural elements in compliance with the encoding and generating the visual pattern by modifying the backing at the level of at least a part of at least one sub-pixel of at least one pixel of the matrix.

9. The method of claim 1, wherein the arrangement is created at the level of two or more different layers of the backing or in different thickness levels of one and a same layer of the backing.

* * * * *